United States Patent [19]

Inami

[11] 4,281,478
[45] Aug. 4, 1981

[54] VEHICLE DOOR STRUCTURE

[75] Inventor: Sumio Inami, Yokohama, Japan

[73] Assignee: Nissan Motor Company Limited, Kanagawa, Japan

[21] Appl. No.: 64,982

[22] Filed: Aug. 9, 1979

[30] Foreign Application Priority Data

Aug. 29, 1978 [JP] Japan .......................... 53-118880[U]

[51] Int. Cl.³ .............................................. E06B 3/00
[52] U.S. Cl. .................................................... 49/503
[58] Field of Search .......................... 49/503, 502, 394

[56] References Cited

U.S. PATENT DOCUMENTS

| 2,797,127 | 6/1957 | Renno | 49/502 |
| 2,797,128 | 6/1957 | Renno | 49/502 |
| 2,797,130 | 6/1957 | Renno | 49/502 |

*Primary Examiner*—Philip C. Kannan
*Attorney, Agent, or Firm*—Lowe, King, Price & Becker

[57] ABSTRACT

A vehicle door structure is disclosed which comprises a door inner panel, and a sash component terminating at its lower end in a reinforcing section formed therein with a recess for reception of a door lock and secured to the door inner panel.

8 Claims, 8 Drawing Figures

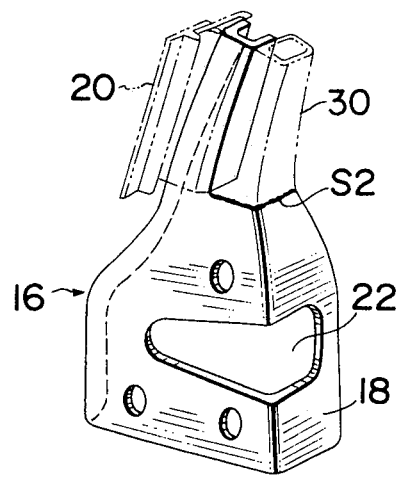
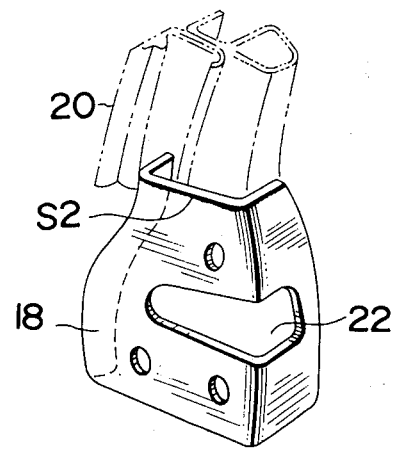
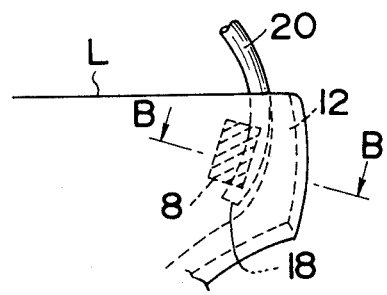
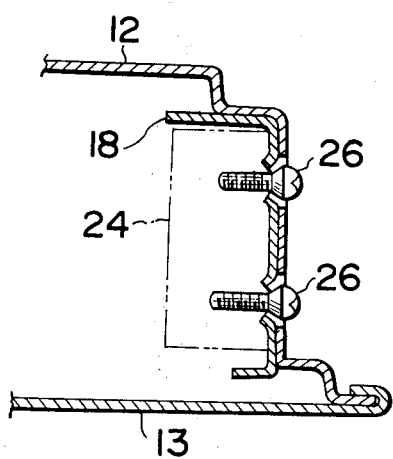
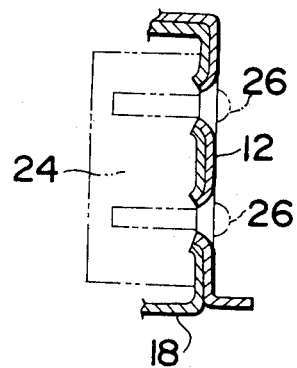

VEHICLE DOOR STRUCTURE

BACKGROUND OF THE INVENTION

1. Field of the Invention

This invention relates to a vehicle door made up of a door panel and a door sash and, more particularly, to a vehicle door structure having a reinforced door lock mounting section.

2. Description of the Prior Art

FIG. 1 is a side view showing a typical conventional vehicle door structure and FIG. 2 is an enlarged sectional view showing the location of the door lock incorporated in the vehicle door structure of FIG. 1. The conventional vehicle rear door structure comprises a door sash 2 welded to an inner panel 4 which constitutes a door panel together with an outer panel 6. A door lock 8 is located inside the inner panel 4 and secured thereto by means of bolts 10. In such a conventional vehicle door structure, however, the door lock mounting section has a relatively large vertical length. This renders it very difficult to lower the waist line L and impedes provision of a wide field of vision. Furthermore, any attempt to lower the waist line L will cause a corresponding reduction in area S1 for welding and thus in connecting strength between the door sash 2 and the inner panel 4. In addition, since the door lock 8 is attached only to the inner panel 4, some troubles would result from its insufficient panel strength.

SUMMARY OF THE INVENTION

It is therefore one object of the present invention to provide an improved vehicle door structure which has a lowered waist line so as to permit a wide field of vision without any reduction in connecting strength between the door sash and inner panel thereof.

Another object of the present invention is to provide an improved vehicle door structure which provides higher panel strength for its door lock mounting section.

According to the present invention, these and other objects are accomplished by a vehicle door structure comprising a door inner panel, and a sash component terminating at its lower end in a reinforcing section formed therein with a recess for reception of a door lock and secured to the door inner panel.

Other objects, means, and advantages of the present invention will become apparent to one skilled in the art thereof from the following description.

BRIEF DESCRIPTION OF THE DRAWINGS

FIG. 4 is a fragmentary perspective view showing a second embodiment of the present invention;

FIG. 5 is a fragmentary perspective view showing a third embodiment of the present invention;

FIG. 6 is a fragmentary side view showing the location of the door lock incorporated in the vehicle door structure of the present invention; and FIGS. 7 and 8 are fragmentary sectional views taken along the line B—B of FIG. 6, showing two different forms of attachment of the door lock.

DESCRIPTION OF THE PREFERRED EMBODIMENTS

Figure 1:
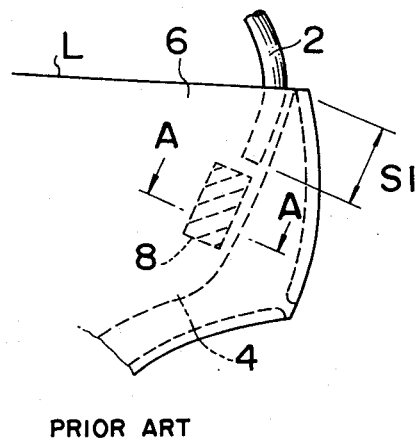
FIG. 1 is a fragmentary side view showing a conventional vehicle door structure.
Figure 2:
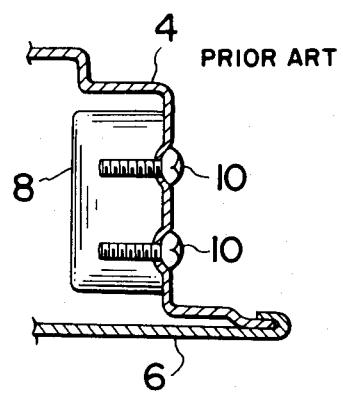
FIG. 2 is an enlarged sectional view taken along the line A—A of FIG. 1, showing the location of the door lock incorporated in the door structure of FIG. 1.
Figure 3:
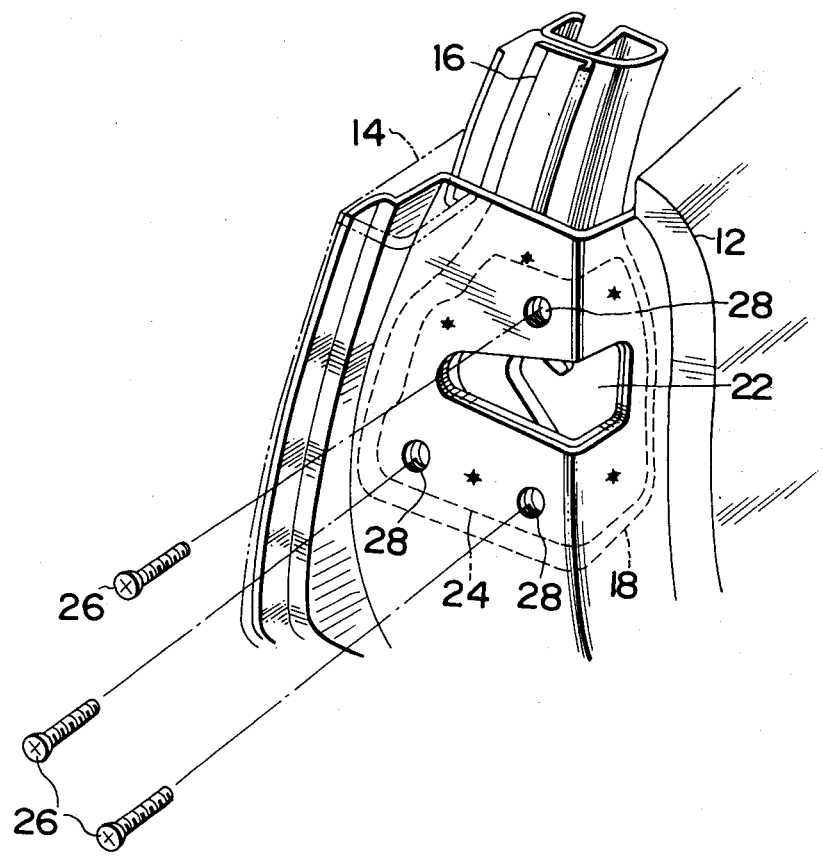
FIG. 3 is a fragmentary perspective view showing one embodiment of a vehicle door structure made in accordance with the present invention.

Referring now to FIG. 3, there is illustrated one embodiment of a vehicle door structure made in accordance with the present invention. The vehicle door structure comprises inner and outer panels 12 and 14, and a one-piece sash component 16 terminating at its lower end in a reinforcing section 18 secured to the inner panel 12. The reinforcing section 18 is formed with a recess 22 for containing therein a door lock 24 which is mounted thereto by means of attaching bolts 26 extending through bolt holes 28 formed in the reinforcing section 18.

Referring to FIG. 4, there is illustrated a second embodiment of the present invention. In this embodiment, the sash component 16 is made up of a reinforcing section 18 and a sash section 20 separately produced. The reinforcing section 18 is formed with a door lock mounting recess 22 and with an extension 30. The extension 30 of the reinforcing section 18 is rigidly fitted in the lower portion of the sash section 20 and welded thereto along a welding line S2.

Referring to FIG. 5, there is illustrated a third embodiment of the present invention. In this embodiment, the sash component 16 is made up of a reinforcing section 18 and a sash section 20 separately produced. The upper end of the reinforcing section 18 is welded along a welding line S2 to the lower end of the sash section 20.

As shown in FIG. 7, the door lock 24 is attached, by means of attaching bolts 26, to the portion where the reinforcing section 18 and the inner panel 12 are welded to each other. FIG. 8 illustrates another form of attachment of the door lock 24, which is similar to the door lock attachment of FIG. 7 except that the bolt holes formed in the inner panel 12 are larger in diameter than the bolt holes formed in the reinforcing section 18. This is effective to absorb errors occurring upon welding the reinforcing section 18 to the inner panel 12 so as to provide high manufacturing efficiency.

With the vehicle door structure of the present invention including a sash component terminating at its lower end in a reinforcing section formed therein with a door lock mounting recess and secured to a door inner panel, it is possible to lower the waist line so as to provide a wide field of vision and also to provide higher panel strength for its door lock mounting section so as to hold the door closed even if a great impact is applied thereto. Additionally, the vehicle door structure of the present invention has an ability to positively connect the sash component and the door panel so as to provide a higher sealing performance between the vehicle body and the sash component.

What is claimed is:

1. A vehicle door structure adapted to be locked to vehicle body by a door lock mechanism, comprising a door inner panel and a sash component terminating at its lower end in a reinforcing section formed therein wherein said reinforcing section has a configuration conforming to a configuration of said inner panel in the area of attachment to the panel to provide a low waist line and thereby a wider field of vision while maintaining sufficient connecting strength between said sash component and said door inner panel when said reinforcing section is secured thereto, a door lock recess formed within said reinforcing section for reception of a door lock; and means for securing said reinforcing section and door lock mechanism to said inner panel with said door lock recess in registration with a corresponding opening in said inner panel.

2. A vehicle door structure according to claim 1, in which the sash component is one piece.

3. A vehicle door structure according to claim 1, in which the sash component is comprised of separately produced sash and reinforcing sections integrally joined with each other.

4. A vehicle door structure according to claim 3, in which the reinforcing section is welded at its upper end to the lower end of the sash section.

5. A vehicle door structure according to claim 3, in which the reinforcing section is formed integrally with an extension fitted in and welded to the sash section.

6. An automotive vehicle door according to claims 1 or 3, wherein means for securing said door lock mechanism and reinforcing section to said door inner panel are bolts extending through bolt holes formed therein, said bolt holes formed in said lower door structure being larger in diameter than those formed in said reinforcing section to effectively absorb errors occuring upon welding the reinforcing section to the inner panel so as to provide high manufacturing efficiency.

7. A vehicle door structure adapted to be locked to vehicle body by a door lock mechanism comprising a door inner panel and a sash component terminating at its lower end in a reinforcing section formed therein, wherein said reinforcing section is outwardly flared at its lower end to provide a low waist line and thereby a wider field of vision while maintaining sufficient connecting strength between said sash component and said door inner panel when said reinforcing section is secured thereto a door lock recess formed within said reinforcing section for reception of a door lock; and means for securing said reinforcing section and door lock mechanism to said inner panel with said door lock recess in registration with the corresponding opening in said inner panel.

8. An automotive vehicle door according to claim 6 wherein means for securing said door lock mechanism and reinforcing section to said door inner panel are bolts extending through bolt holes formed therein, said bolt holes formed in said lower door structure being larger in diameter than those formed in said reinforcing section to effectively absorb errors occuring upon welding the reinforcing section to the inner panel so as to provide high manufacturing efficiency.

* * * * *